(12) United States Patent
Kim (10) Patent No.: US 8,623,540 B2
(45) Date of Patent: Jan. 7, 2014

(54) RECHARGEABLE BATTERY AND RECHARGEABLE BATTERY MODULE

(75) Inventor: Sung-Bae Kim, Suwon-si (KR)

(73) Assignees: Samsung SDI Co., Ltd., Yongin-Si, Gyeonggi-do (KR); Robert Bosch, GmbH, Stuttgart (DE)

( * ) Notice: Subject to any disclaimer, the term of this patent is extended or adjusted under 35 U.S.C. 154(b) by 636 days.

(21) Appl. No.: 12/659,263

(22) Filed: Mar. 2, 2010

(65) Prior Publication Data

US 2010/0227212 A1 Sep. 9, 2010

(30) Foreign Application Priority Data

Mar. 3, 2009 (KR) .................. 10-2009-0018159

(51) Int. Cl.
*H01M 2/24* (2006.01)

(52) U.S. Cl.
USPC .......................................... 429/158; 429/160

(58) Field of Classification Search
USPC .............................................. 429/158; 3/158
See application file for complete search history.

(56) References Cited

U.S. PATENT DOCUMENTS

| | | | |
|---|---|---|---|
| 7,556,533 B2 | 7/2009 | Seo | |
| 7,935,438 B2 | 5/2011 | Kim | |
| 2005/0250006 A1* | 11/2005 | Kim | 429/160 |
| 2006/0091855 A1* | 5/2006 | Seo | 320/116 |
| 2009/0186269 A1* | 7/2009 | Kim et al. | 429/179 |

FOREIGN PATENT DOCUMENTS

| | | |
|---|---|---|
| JP | 2001-229897 A | 8/2001 |
| JP | 2008-091183 A | 4/2008 |
| JP | 2008-270033 A | 11/2008 |
| KR | 10-2005-0106540 A | 11/2005 |
| KR | 10-2006-0037604 A | 5/2006 |
| KR | 10-2007-0080871 A | 8/2007 |

* cited by examiner

*Primary Examiner* — Patrick Ryan
*Assistant Examiner* — Lucas J O'Donnell
(74) *Attorney, Agent, or Firm* — Lee & Morse, P.C.

(57) ABSTRACT

A rechargeable battery and rechargeable battery module, the rechargeable battery including a case housing an electrode assembly, a cap plate sealing the case, at least one first insulator disposed on an outer surface of the cap plate, a pair of electrode terminals penetrating the cap plate and the first insulator, and a bus bar coupled to one of the electrode terminals, wherein the cap plate and first insulator include a first joining unit coupling the first insulator and the cap plate and the first insulator and bus bar include a second joining unit selectively coupling the first insulator and the bus bar.

13 Claims, 5 Drawing Sheets

RECHARGEABLE BATTERY AND RECHARGEABLE BATTERY MODULE

BACKGROUND

1. Field

Embodiments relate to a rechargeable battery and a rechargeable battery module.

2. Description of the Related Art

Hybrid or electric vehicles that are driven by an internal combustion engine and/or an electric motor may be provided with a power supply that supplies electrical power to the electric motor, e.g., a high-power motor. The power supply may include a plurality of rechargeable batteries connected to each other in order to supply high-voltage power to the high-power motor. That is, the power supply may include a plurality of rechargeable battery modules that are connected to each other, e.g., in series. The rechargeable battery modules may be formed by connecting the rechargeable batteries, i.e., a plurality of unit cells, in series.

The serial connection may connect a positive electrode terminal of one unit cell with a negative electrode terminal of an adjacent unit cell with a bus bar. The serial connection may then be repeated, connecting a positive electrode terminal of another unit cell to a negative electrode terminal of another adjacent unit cell with another bus bar.

The serially connected unit cells may have a repeating structure including a plurality of unit cells and a plurality of bus bars in a single rechargeable battery module. The serially connected unit cells may be made by repeated labor performed by a worker.

SUMMARY

It is a feature of an embodiment to provide a rechargeable battery module that may prevent mis-alignment of electrode terminals when assembling the rechargeable battery module from unit cells.

At least one of the above and other features and advantages may be realized by providing a rechargeable battery including a case housing an electrode assembly, a cap plate sealing the case, at least one first insulator disposed on an outer surface of the cap plate, a pair of electrode terminals penetrating the cap plate and the first insulator, and a bus bar coupled to one of the electrode terminals, wherein the cap plate and first insulator include a first joining unit coupling the first insulator and the cap plate, and the first insulator and bus bar include a second joining unit selectively coupling the first insulator and the bus bar.

The first joining unit may include an outer protrusion protruding from the cap plate and a concave outer groove in the first insulator, and the outer protrusion may correspond to the outer groove.

The pair of electrode terminals may include a positive electrode terminal and a negative electrode terminal, the second joining unit may include a positive joining portion and a negative joining portion, the positive joining portion may correspond to the positive electrode terminal, the negative joining portion may correspond to the negative electrode terminal, and the positive joining portion may have a different structure from the negative joining portion.

The at least one first insulator may include a positive first insulator adjacent to the positive electrode terminal and a negative first insulator adjacent to the negative electrode terminal, the positive joining portion may include a cylindrical protrusion disposed on the positive first insulator and a corresponding cylindrical groove disposed in the bus bar, and the negative joining portion may include a quadrangular column protrusion disposed on the negative first insulator and a corresponding quadrangular groove disposed in the bus bar.

The pair of electrode terminals may include a positive electrode terminal and a negative electrode terminal, the second joining unit may include a positive joining portion and a negative joining portion, the positive joining portion may correspond to the positive electrode terminal, the negative joining portion may correspond to the negative electrode terminal, and the positive joining portion may be disposed at a position relative to the positive electrode terminal, the negative joining portion may be disposed at a position relative to the negative electrode terminal, and the position of the positive joining portion relative to the positive electrode terminal may be different from the position of the negative joining portion relative to the negative electrode terminal.

The at least one first insulator may include a positive first insulator adjacent to the positive electrode terminal and a negative first insulator adjacent to the negative electrode terminal, the positive joining portion may include a positive cylindrical protrusion disposed on a center line of the positive first insulator and a corresponding positive groove disposed in the bus bar, and the negative joining portion may include a negative cylindrical protrusion disposed at a position offset from a center line of the negative first insulator, and a corresponding negative groove disposed in the bus bar.

The rechargeable battery may further include a second insulator disposed on an inner surface of the cap plate, wherein the second insulator and the cap plate include a third joining unit coupling the second insulator and the cap plate.

The third joining unit may include an inner protrusion protruding from the second insulator and a concave inner groove in the cap plate, and the inner protrusion may correspond to the inner groove.

At least one of the above and other features and advantages may also be realized by providing a rechargeable battery module including a plurality of unit cells disposed adjacent to each other, each unit cell including electrode terminals; and a bus bar connecting the electrode terminals of adjacent unit cells in series, wherein the unit cells each include a case housing an electrode assembly; a cap plate sealing the case; at least one first insulator disposed on an outer surface of the cap plate, the cap plate and first insulator including a first joining unit coupling the first insulator and the cap plate; and a pair of electrode terminals penetrating the cap plate and the first insulator; and the bus bar and the first insulator of each unit cell including a second joining unit coupling the bus bar and the first insulators of adjacent unit cells.

The first joining unit may include an outer protrusion protruding from the cap plate and a concave outer groove in the first insulator, and the outer protrusion may correspond to the outer groove.

The pair of electrode terminals may include a positive electrode terminal and a negative electrode terminal, the second joining unit may include a positive joining portion and a negative joining portion, the positive joining portion may correspond to the positive electrode terminal, the negative joining portion may correspond to the negative electrode terminal, and the positive joining portion may have a different structure from the negative joining portion.

The at least one first insulator may include a positive first insulator adjacent to the positive electrode terminal and a negative first insulator adjacent to the negative electrode terminal, the positive joining portion may include a cylindrical protrusion disposed on the positive first insulator and a corresponding cylindrical groove disposed in the bus bar, and the second joining portion may include a quadrangular column protrusion disposed on the negative first insulator and a corresponding quadrangular groove disposed in the bus bar.

The pair of electrode terminals may include a positive electrode terminal and a negative electrode terminal, the second joining unit may include a positive joining portion and a negative joining portion, the positive joining portion may correspond to the positive electrode terminal, the negative joining portion may correspond to the negative electrode terminal, and the positive joining portion may be disposed at a position relative to the positive electrode terminal, the negative joining portion may be disposed at a position relative to the negative electrode terminal, and the position of the positive joining portion relative to the positive electrode terminal may be different from the position of the negative joining portion relative to the negative electrode terminal.

The at least one first insulator may include a positive first insulator adjacent to the positive electrode terminal and a negative first insulator adjacent to the negative electrode terminal, the positive joining portion may include a positive cylindrical protrusion disposed on a center line of the positive first insulator and a corresponding positive cylindrical groove disposed in the bus bar, and the negative joining portion may include a negative cylindrical protrusion disposed at a position offset from the center line of the negative first insulator and a corresponding negative cylindrical groove disposed in the bus bar.

At least one of the above and other features and advantages may also be realized by providing a rechargeable battery module including a plurality of unit cells connected with bus bars, each unit cell having a positive electrode terminal and a negative electrode terminal disposed symmetrically to each other, a positive first insulator corresponding to the positive electrode terminal, and a negative first insulator corresponding to the negative electrode terminal, wherein the positive electrode terminal of one of the unit cells and the negative electrode terminal of an adjacent unit cell are connected to each other with the bus bar, the positive first insulator has a positive joining structure, a positive joining position, and a positive joining range relative to the bus bar, the negative first insulator has a negative joining structure, a negative joining position, and a negative joining range of an insulator relative to the bus bar, and at least one of the positive and negative joining structures, the positive and negative joining positions, and the positive and second negative ranges are different.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0018159, filed on Mar. 3, 2009, in the Korean Intellectual Property Office, and entitled: "Rechargeable Battery and Module Thereof," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
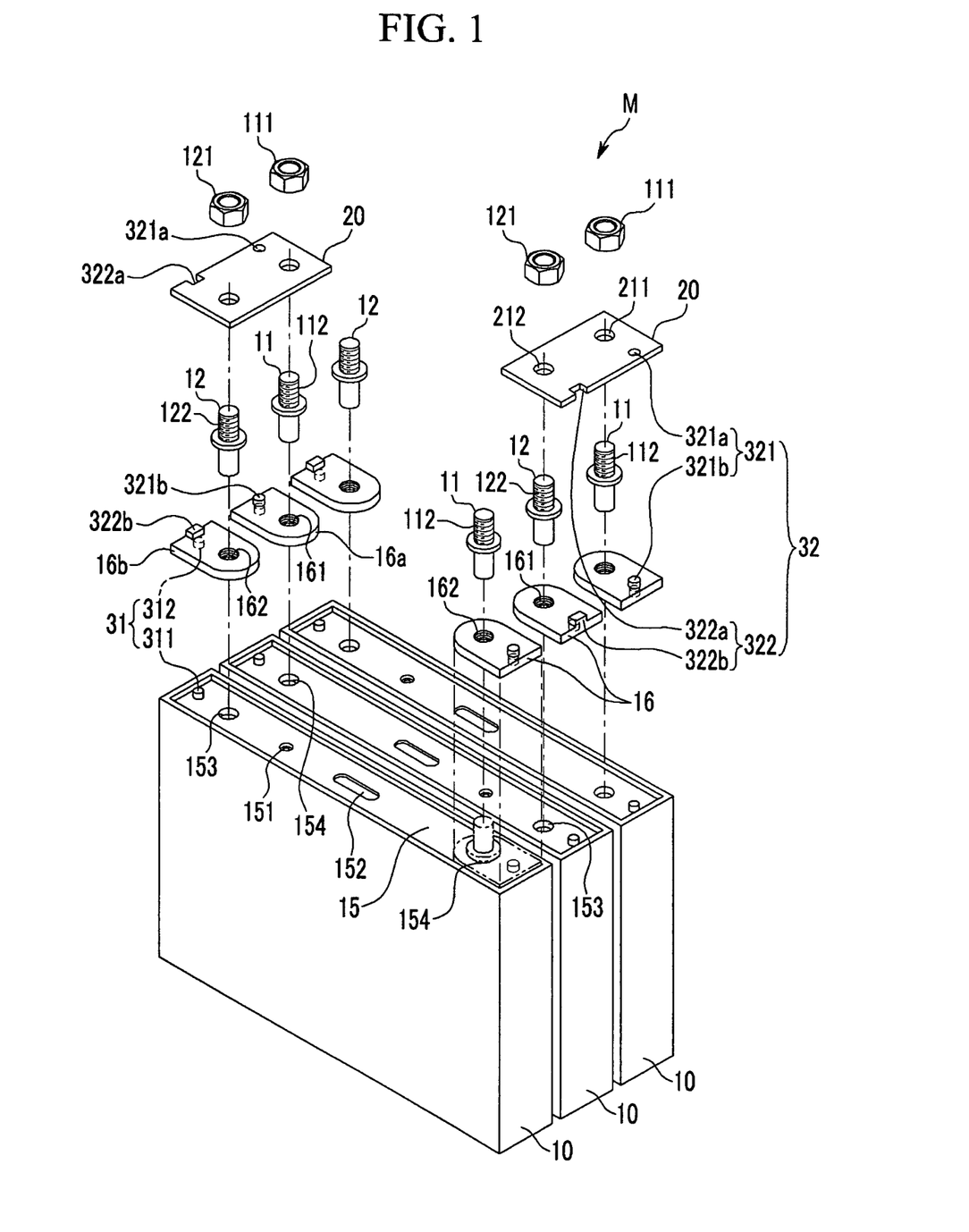
FIG. 1 illustrates an exploded perspective view of a rechargeable battery module according to an embodiment.
Figure 2:
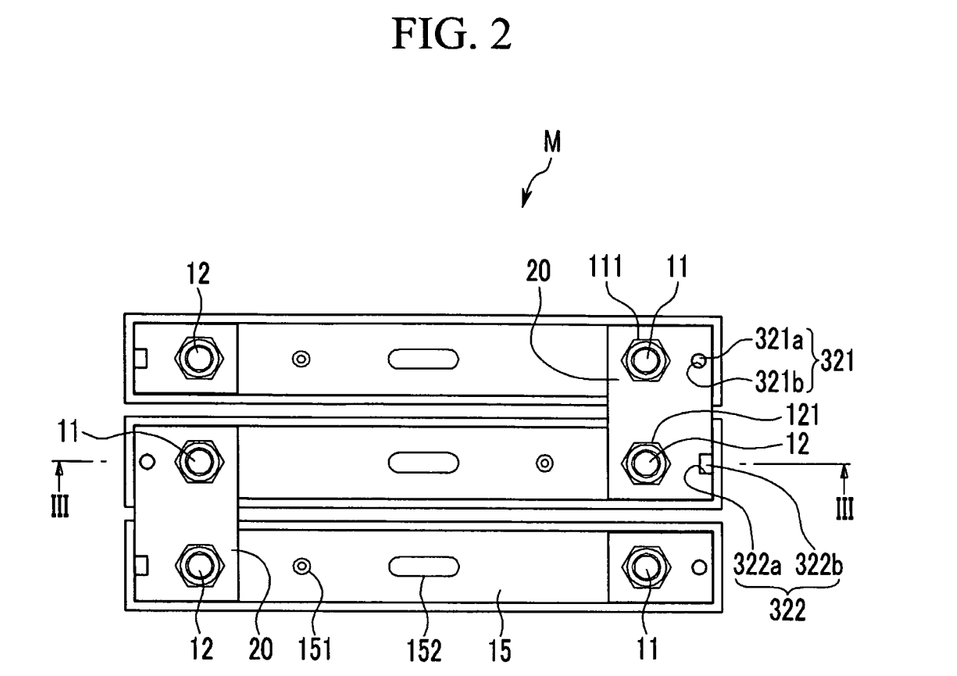
FIG. 2 illustrates a plan view of the rechargeable battery module shown in FIG. 1.

FIG. 1 illustrates an exploded perspective view of a rechargeable battery module according to an embodiment. FIG. 2 illustrates a plan view of the rechargeable battery module shown in FIG. 1. Referring to FIGS. 1 and 2, the rechargeable battery module M according to an embodiment may include two or more unit cells 10 sequentially disposed adjacent to each other. The rechargeable battery module M may also include one or more connection members, e.g., bus bars 20, that connect the unit cells 10 to each other in series.

The bus bar 20 may connect a positive electrode terminal 11 of a unit cell 10 with a negative electrode terminal 12 of an adjacent unit cell 10 in series to form the high-output rechargeable battery module M. The output of the rechargeable battery module M may be determined by the number of unit cells 10 that are connected to each other in series.

Figure 3:
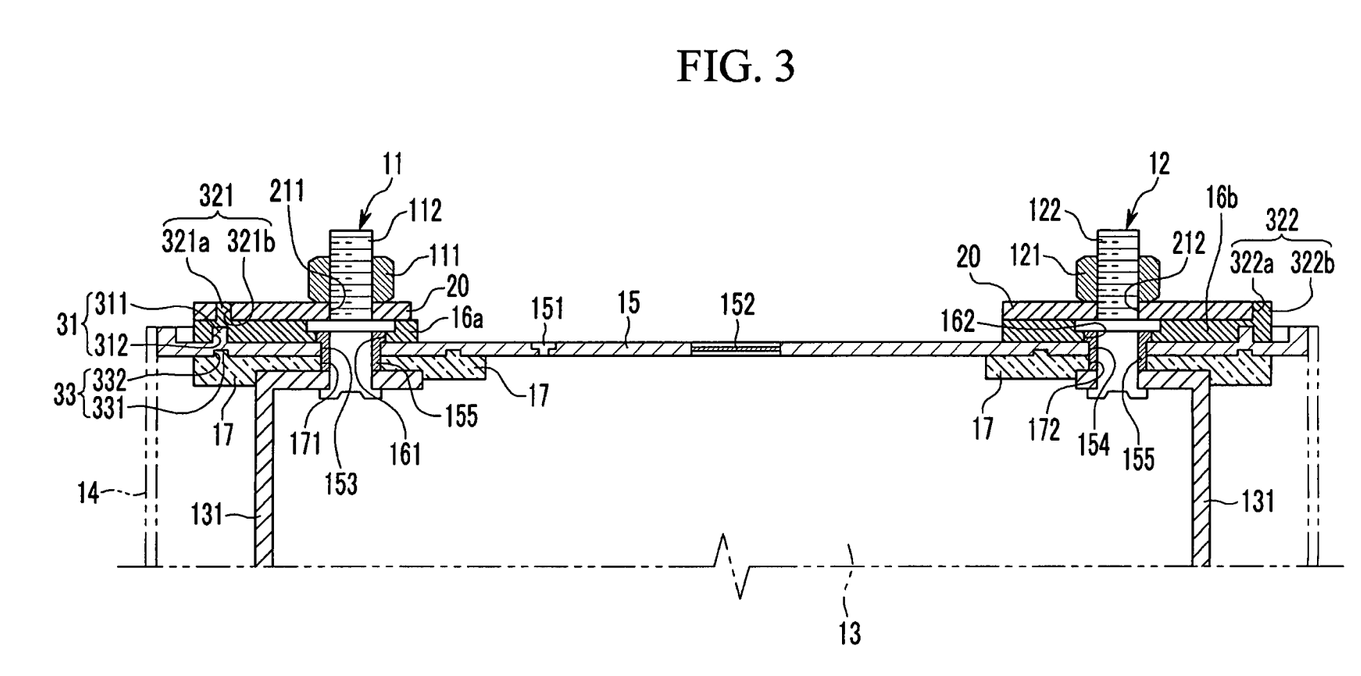
FIG. 3 illustrates a cross-sectional view taken along line III-III of FIG. 2.

FIG. 3 illustrates a cross-sectional view taken along line III-III of FIG. 2. Referring to FIG. 3, the unit cell 10 may form a rechargeable battery and may include an electrode assembly 13 connected to the positive electrode terminal 11 and the negative electrode terminal 12. The unit cell 10 may also include a case 14 housing the electrode assembly 13, a cap plate 15 sealing an opening in the case 14, at least one first insulator 16 (see FIG. 1) disposed on an outer surface of the cap plate 15, and a second insulator 17 disposed on an inner surface of the cap plate 15.

For example, the case 14 may form an exterior of the unit cell 10. The case 14 may include a conductive metal, e.g., aluminum, an aluminum alloy, or nickel-plated steel. The case 14 may include a space for housing the electrode assembly 13. As shown in FIG. 3, the case 14 may have a hexahedral prismatic shape. However, the case 14 may have any other suitable shape.

The positive electrode terminal 11 and the negative electrode terminal 12 may be connected to the electrode assembly 13. The polarities of the electrode terminals may be reversed depending on the charging/discharging state of the unit cell. All positive and negative designations of associated components herein may likewise be reversed. The positive electrode terminal 11 and the negative electrode terminal 12 may protrude outside of the case 14 to electrically connect the electrode assembly 13 to the outside of the unit cell 10. The positive electrode terminal 11 and the negative electrode terminal 12 may have positive and negative bolt portions 112 and 122 and positive and negative nuts 111 and 121 so as to be connected to each other with, e.g., the bus bar 20.

The positive electrode terminal 11 and the negative electrode terminal 12 may penetrate the cap plate 15. The first insulator 16 and the second insulator 17 may be disposed on the outer surface and the inner surface of the cap plate 15, respectively.

The cap plate 15 may include a thin plate having an electrolyte injection opening (not shown) for injecting an electrolyte into the sealed case 14. The electrolyte injection opening may be sealed with a sealing closure 151 after the electrolyte is injected. The cap plate 15 may have a vent portion 152 to vent gas and prevent explosion of the unit cell 10.

The cap plate 15 may have a positive terminal hole 153 and a negative terminal hole 154 corresponding to the positive electrode terminal 11 and the negative electrode terminal 12, respectively. The positive electrode terminal 11 and the negative electrode terminal 12 may be inserted through the cap plate 15, and gaskets 155 may be interposed between the electrode terminals 11 and 12 and the positive and negative terminal holes 153 and 154, respectively. The positive electrode terminal 11 and the negative electrode terminal 12 may be connected to the electrode assembly 13 through a current collecting member 131 inside of the case 14. The gaskets 155, the first insulator 16, and the second insulator 17 may electrically insulate the positive electrode terminal 11 and the negative electrode terminal 12 from the cap plate 15.

The first insulator 16 may be disposed on the cap plate 15. The cap plate 15 and the first insulator 16 may include a first joining unit 31, coupling the first insulator 16 and the cap plate 15. The first insulator 16 may include a positive first insulator 16a and a negative first insulator 16b. The positive first insulator 16a may be disposed adjacent to the positive electrode terminal 11. The negative first insulator 16b may be disposed adjacent to the negative electrode terminal 12. The positive first insulator 16a may have a positive terminal hole 161. The negative first insulator 16b may have a negative terminal hole 162. The gasket 155 may be interposed between the positive terminal hole 161 and the positive electrode terminal 11 and/or between the negative terminal hole 162 and the negative electrode terminal 12. A bus bar 20 may be disposed on a pair of positive and negative first insulators 16a and 16b of adjacent unit cells 10. Positive and negative nuts 111 and 121 may then be coupled to the positive and negative bolt portions 112 and 122, respectively, to hold the bus bar 20 in place. The first joining unit 31 may thereby prevent rotation of the first insulators 16 on the outer surface of the cap plate 15.

The first joining unit 31 will be described herein in detail. The first joining unit 31 may include an outer protrusion 311 and an outer groove 312. The outer protrusion 311 may be disposed on the cap plate 15, and may protrude toward the first insulator 16. The outer groove 312 may be disposed on the first insulator 16, and may be concave to correspond to the outer protrusion 311. The outer protrusion 311 and the outer groove 312 may be coupled to each other, and may fix the first insulator 16 on the outer surface of the cap plate 15. The first joining unit 31 may be in a periphery of the cap plate 15, i.e., the first joining unit 31 for the positive electrode terminal 11 and negative electrode terminal 12 may be mirror images.

The bus bar 20 may be disposed on a pair of positive and negative first insulators 16a and 16b (see FIGS. 1 and 2) to electrically connect electrode terminals having opposite polarities of two adjacent unit cells 10. The bus bar 20 may have a positive terminal hole 211 and a negative terminal hole 212 corresponding to the two electrode terminals having opposite polarities, e.g., the positive electrode terminal 11 of a unit cell 10 and the negative electrode terminal 12 of an adjacent unit cell 10.

The bus bar 20 and the first insulator 16 may include a second joining unit 32. The second joining unit 32 may couple a pair of positive and negative first insulators 16a and 16b of two adjacent unit cells 10 and a corresponding bus bar 20.

A first end of the second joining unit 32 may be coupled to a first side of the bus bar 20 and the positive first insulator 16a of the positive electrode terminal 11. A second end of the second joining unit 32 may be coupled to a second side of the bus bar 20 and the negative first insulator 16b of the negative electrode terminal 12. Because of this configuration, the coupling cannot be reversed so the unit cells 10 may only be connected in a single, proper configuration. Accordingly, the second joining unit 32 may prevent mis-assembly when connecting the unit cells 10 in series with the bus bar 20.

For example, when a joining structure, position, and range of the second joining unit 32 coupling the positive first insulator 16a and the bus bar 20 are compared with a joining structure, position, and range of the second joining unit 32 coupling the negative first insulator 16b and the bus bar 20, at least one of the joining structure position, and range may be different. This difference may help ensure that the unit cells 10 are only aligned in a single direction when connected in series, lowering the possibility of mis-assembly.

The second joining unit 32 will be described herein in detail. According to an embodiment, the second joining unit 32 of the positive electrode terminal 11 and the joining unit 32 of the negative electrode terminal 12 may have different joining structures, positions, and/or ranges. That is, the second joining unit 32 may include a positive joining portion 321 corresponding to the positive electrode terminal 11 and a negative joining portion 322 corresponding to the negative electrode terminal 12. The negative joining portion 322 may have a different structure from the positive joining portion 321.

The positive joining portion 321 may include, e.g., a circular hole 321a disposed on the first end of the bus bar 20 and a corresponding cylindrical protrusion 321b disposed on the positive first insulator 16a. During assembly of the rechargeable battery module M, the circular protrusion 321b may be coupled to the corresponding circular hole 321a. The negative joining portion 322 may include, e.g., a quadrangular cut portion 322a disposed on the second end of the bus bar 20 and a corresponding quadrangular column protrusion 322b disposed on the negative first insulator 16b. During assembly of the rechargeable battery module M, the quadrangular column protrusion 322b may be coupled to the quadrangular cut portion 322a. However, the shapes of the positive and negative joining portions 321 and 322 are not limited thereto. The positive and negative joining portions 321 and 322 may be any suitable complementary shapes that are able to couple amongst themselves while being unable to couple to the opposing joining portion.

A first joining structure and range of the circular hole 321a and the cylindrical column protrusion 321b of the positive joining portion 321 may be different from a second joining structure and range of the quadrangular cut portion 322a and the quadrangular column protrusion 322b of the negative joining portion 322. Because the positive joining portion 321 and the negative joining portion 322 may have different joining structures and joining ranges, the bus bar 20 may only couple to the positive electrode terminal 11 and the negative electrode terminal 12 of adjacent unit cells 10 in a single proper configuration. Therefore, the rechargeable battery module M cannot be mis-assembled in an improper configuration.

The second insulator 17 may be disposed on the inner surface of the cap plate 15. The second insulator 17 and the cap plate 15 may include a third joining unit 33. The second insulator 17 may have a terminal hole 171 corresponding to its adjacent electrode terminal 11 or 12. A gasket 155 may be interposed between the terminal hole 171 and the electrode terminal 11 or 12.

Figure 4:
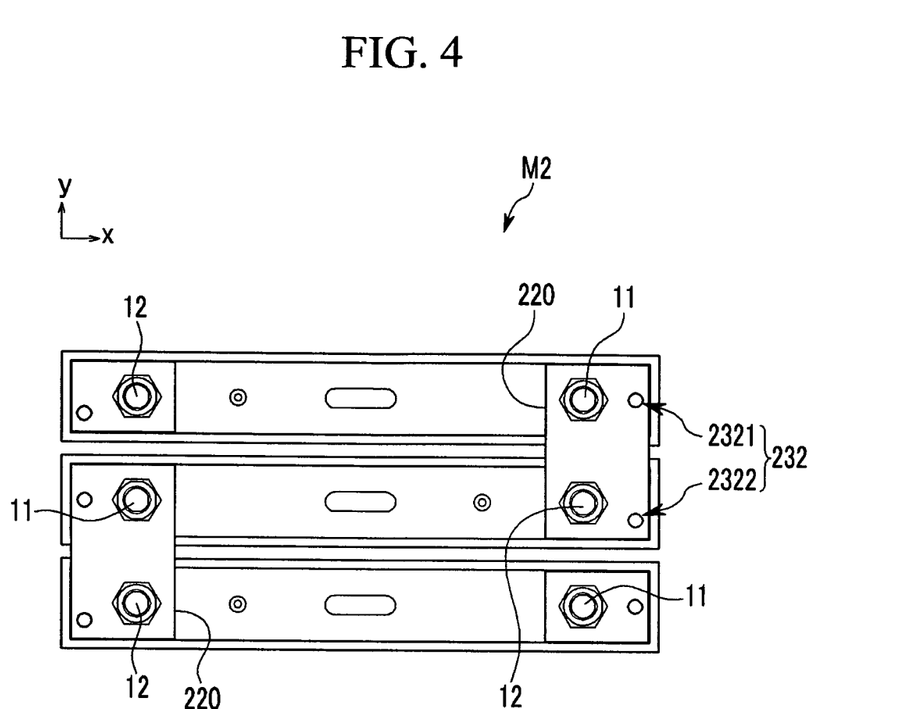
FIG. 4 illustrates a plan view of a rechargeable battery module according to another embodiment.
Figure 5:
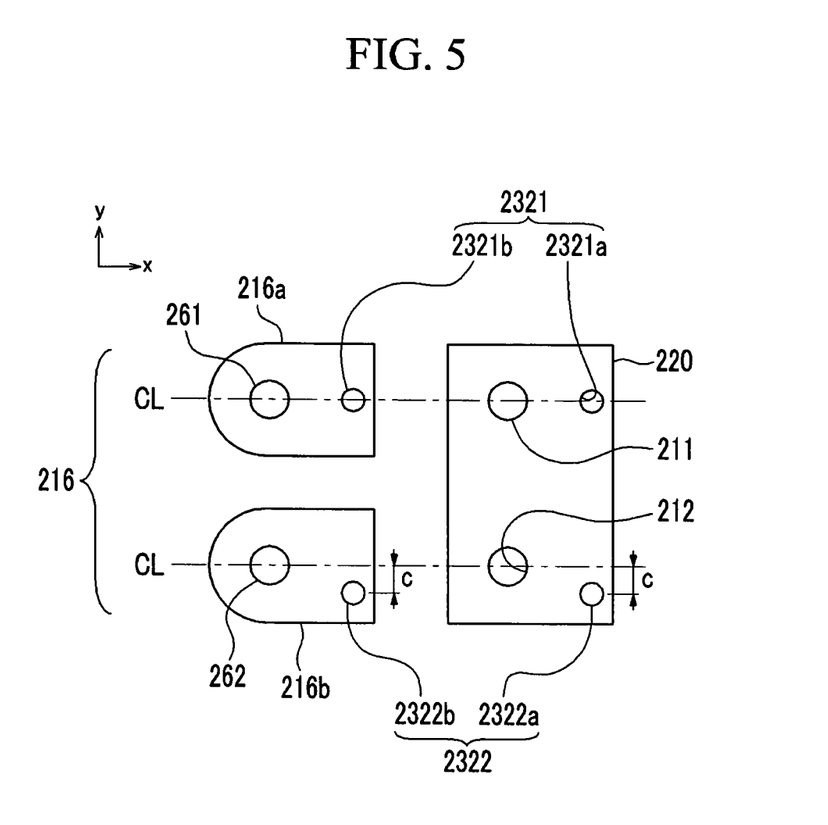
FIG. 5 illustrates a plan view of first insulators disposed in a pair of unit cells and a bus bar corresponding thereto as shown in FIG. 4.

The third joining unit 33 may include an inner protrusion 331 on the second insulator 17 protruding toward the cap plate 15. The third joining unit 33 may also include a corresponding concave inner groove 332 in the cap plate 15. The current collecting member 131 may be disposed below the second insulators 17. When the positive electrode terminal 11 and the negative electrode terminal 12 are riveted, the third joining unit 33 may advantageously prevent the second insulators 17 from moving on the inner surface of the cap plate 15. The third joining unit 33 may be in a periphery of the cap plate 15, i.e., the third joining unit 33 for the positive electrode terminal 11 and negative electrode terminal 12 may be mirror images FIG. 4 illustrates a plan view of a rechargeable battery module M2 according to another embodiment. FIG. 5 illustrates a plan view of a bus bar corresponding to first insulators disposed in a pair of unit cells in FIG. 4.

Referring to FIGS. 4 and 5, a positive joining unit 232 corresponding to a positive electrode terminal 11 and a negative joining unit 232 corresponding to a negative electrode terminal 12 may be disposed at different positions on the positive and negative first insulators 216a and 216b and bus bar 220. A positive joining portion 2321 corresponding to the positive electrode terminal 11 and a negative joining portion 2322 corresponding to the negative electrode terminal 12 may have different joining structures, as described in the previous embodiment. Alternatively, the positive joining portion 2321 and the negative joining portion 2322 may have the same joining structure, e.g., circular, but at different positions, as shown in FIG. 5.

A distance between the positive joining portion 2321 and the positive electrode terminal 11 and a distance between the negative joining portion 2322 and the negative electrode terminal 12 in an x-axis direction may be different from each other. Alternatively, as illustrated in FIG. 4, the distance between the positive joining portion 2321 and the positive electrode terminal 11 and the distance between the negative joining portion 2322 and the negative electrode terminal 12 in an x-axis direction may be the same.

In an embodiment, as illustrated in FIG. 5, the negative joining portion 2322 on the bus bar 220 and negative first insulator 216b may be offset from a center line CL of the negative terminal hole 262 by a distance c in a y-axis direction. The positive joining portion 2321 on the bus bar 220 and the positive first insulator 216a may be disposed on the center line CL of the positive terminal hole 261. Accordingly positions of the positive joining portion 2321 and the corresponding negative joining portion 2322 in the positive and negative first insulators 216a and 216b and bus bars 220 may be different from each other. This difference in position may help ensure that the positive and negative first insulators 216a and 216b and bus bars 220 may only be aligned in a single, proper configuration, reducing errors during assembly of a rechargeable battery module M2.

Specifically, the positive joining portion 2321 may include, e.g., a positive circular hole 2321a on the bus bar 220 and a positive cylindrical column protrusion 2321b on the positive first insulator 216a. The positive circular hole 2321a may be disposed at a first end of the bus bar 220. The positive cylindrical column protrusion 2321b may be disposed on the center line CL of the positive first insulator 216a corresponding to the positive circular hole 2321a in the bus bar 220.

The negative joining portion 2322 may include, e.g., a negative circular hole 2322a and a negative cylindrical column protrusion 2322b. The negative circular hole 2322a may be disposed at a second end of the bus bar 220. The negative cylindrical column protrusion 2322b may be disposed at a position offset from the center line CL of the negative first insulator 216b by the distance c, and correspond to the negative circular hole 2322a in the bus bar 220.

Because the positive joining portion 2321 and the negative joining portion 2322 may be coupled at different positions in a pair of positive and negative first insulators 216a and 216b and corresponding bus bar 220, the bus bar 220 may only be assembled in a single, proper configuration. Therefore, the rechargeable battery module M2 cannot be mis-assembled in an improper configuration with respect to the positive electrode terminal 11 and the negative electrode terminal 12.

Mis-assembly of bus bars in a typical battery module may occur, e.g., connecting a positive electrode terminal to another positive electrode terminal, or a negative electrode terminal to another negative electrode terminal, due to, e.g., a worker's mistake.

In order to prevent mis-assembly, positions of the positive electrode terminal and the negative electrode terminal may be changed, but in this case, additional changes of design may be required, e.g., a change of a structure of an electrode assembly incorporated in the unit cell, etc.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
   a case housing an electrode assembly;
   a cap plate sealing the case;
   a first insulator disposed on an outer surface of the cap plate,
   a pair of electrode terminals penetrating the cap plate and the first insulator; and
   a bus bar coupled to one of the electrode terminals, wherein:
   the cap plate and first insulator include a first joining unit coupling the first insulator and the cap plate,
   the first insulator and bus bar include a second joining unit selectively coupling the first insulator and the bus bar,
   the first joining unit includes:
      an outer protrusion that is monolithically formed with the cap plate and that protrudes from the cap plate, and
      a concave outer groove in the first insulator,
   the outer protrusion has a shape that is complementary to the outer groove,
   the pair of electrode terminals includes a positive electrode terminal and a negative electrode terminal,
   the second joining unit includes a positive joining portion and a negative joining portion, the positive joining portion being adjacent to the positive electrode terminal and the negative joining portion being adjacent to the negative electrode terminal,
   the first insulator includes a positive first insulator adjacent to the positive electrode terminal and a negative first insulator adjacent to the negative electrode terminal, the positive joining portion includes a protrusion on the positive first insulator and a complementary groove in the bus bar, and the negative joining portion includes a protrusion on the negative first insulator and a complementary groove in the bus bar.

2. The rechargeable battery as claimed in claim 1, wherein: the positive joining portion has a different structure from the negative joining portion.

3. The rechargeable battery as claimed in claim 2, wherein: the protrusion of the positive joining portion is a cylindrical protrusion disposed on the positive first insulator and the complementary groove in the bus bar is a complementary cylindrical groove disposed in the bus bar, and the protrusion of the negative joining portion is a quadrangular column protrusion disposed on the negative first insulator and the complementary groove in the bus bar is a complementary quadrangular groove disposed in the bus bar.

4. The rechargeable battery as claimed in claim 1, wherein: the positive joining portion is disposed at a position relative to the positive electrode terminal, the negative joining portion is disposed at a position relative to the negative electrode terminal, and the position of the positive joining portion relative to the positive electrode terminal is different from the position of the negative joining portion relative to the negative electrode terminal.

5. The rechargeable battery as claimed in claim 4, wherein the protrusion of the positive joining portion is a positive cylindrical protrusion disposed on a center line of the positive first insulator and the complementary groove in the bus bar is a complementary positive groove disposed in the bus bar, and the protrusion of the negative joining portion is a negative cylindrical protrusion disposed at a position offset from a center line of the negative first insulator, and the complementary groove in the bus bar is a complementary negative groove disposed in the bus bar.

6. The rechargeable battery as claimed in claim 1, further comprising a second insulator disposed on an inner surface of the cap plate, wherein the second insulator and the cap plate include a third joining unit coupling the second insulator and the cap plate.

7. The rechargeable battery as claimed in claim 6, wherein: the third joining unit includes an inner protrusion protruding from the second insulator and a concave inner groove in the cap plate, and the inner protrusion has a shape that is complementary to the inner groove.

8. A rechargeable battery module, comprising:
a plurality of unit cells disposed adjacent to each other, each unit cell including electrode terminals; and
a bus bar connecting the electrode terminals of adjacent unit cells in series,
wherein the unit cells each include:
a case housing an electrode assembly;
a cap plate sealing the case;
a first insulator disposed on an outer surface of the cap plate, the cap plate and first insulator including a first joining unit coupling the first insulator and the cap plate; and
a pair of electrode terminals penetrating the cap plate and the first insulator; and
the bus bar and the first insulator of each unit cell including a second joining unit coupling the bus bar and the first insulators of adjacent unit cells, wherein:
the first joining unit includes:
an outer protrusion that is monolithically formed with the cap plate and that protrudes from the cap plate, and
a concave outer groove in the first insulator,
the outer protrusion has a shape that is complementary to the outer groove,
the pair of electrode terminals includes a positive electrode terminal and a negative electrode terminal,
the second joining unit includes a positive joining portion and a negative joining portion, the positive joining portion being adjacent to the positive electrode terminal and the negative joining portion being adjacent to the negative electrode terminal,
the first insulator includes a positive first insulator adjacent to the positive electrode terminal and a negative first insulator adjacent to the negative electrode terminal,
the positive joining portion includes a protrusion on the positive first insulator and a complementary groove in the bus bar, and
the negative joining portion includes a protrusion on the negative first insulator and a complementary groove in the bus bar.

9. The rechargeable battery module as claimed in claim 8, wherein:
the positive joining portion has a different structure from the negative joining portion.

10. The rechargeable battery module as claimed in claim 9, wherein:
the protrusion of the positive joining portion is a cylindrical protrusion disposed on the positive first insulator and the complementary groove in the bus bar is a complementary cylindrical groove disposed in the bus bar, and
the protrusion of the negative joining portion is a quadrangular column protrusion disposed on the negative first insulator and the complementary groove in the bus bar is a complementary quadrangular groove disposed in the bus bar.

11. The rechargeable battery module as claimed in claim 8, wherein:
the positive joining portion is disposed at a position relative to the positive electrode terminal, the negative joining portion is disposed at a position relative to the negative electrode terminal, and the position of the positive joining portion relative to the positive electrode terminal is different from the position of the negative joining portion relative to the negative electrode terminal.

12. The rechargeable battery module as claimed in claim 11, wherein
the protrusion of the positive joining portion is a positive cylindrical protrusion disposed on a center line of the positive first insulator and the complementary groove in the bus bar is a complementary positive groove disposed in the bus bar, and
the protrusion of the negative joining portion is a negative cylindrical protrusion disposed at a position offset from a center line of the negative first insulator, and the complementary groove in the bus bar is a complementary negative groove disposed in the bus bar.

13. A rechargeable battery module, comprising:
a plurality of unit cells connected with bus bars, each unit cell having a positive electrode terminal and a negative electrode terminal disposed symmetrically to each other, a positive first insulator on the positive electrode terminal, and a negative first insulator on the negative electrode terminal, wherein:
the positive electrode terminal of one of the unit cells and the negative electrode terminal of an adjacent unit cell are connected to each other with the bus bar, the positive first insulator has a positive joining structure, a positive joining position, and a positive joining range relative to the bus bar, the negative first insulator has a negative joining structure, a negative joining position, and a negative joining range of an insulator relative to the bus bar, at least one of the positive and negative joining structures, the positive and negative joining positions, and the positive and second negative ranges are different, a cap plate of each of the unit cells and each of the positive first insulator and negative first insulator include a first joining unit coupling the positive first insulator and the negative first insulator with the cap plate, the first joining unit includes:
   an outer protrusion that is monolithically formed with the cap plate and that protrudes from the cap plate, and
   a concave outer groove in the positive first insulator and the negative first insulator, the outer protrusion has a shape that is complementary to the outer groove, the positive joining structure includes a protrusion on the positive first insulator and the bus bar includes a complementary groove therein, and the negative joining structure includes a protrusion on the negative first insulator and the bus bar includes another complementary groove therein.

* * * * *